(12) United States Patent
Matsuda et al.

(10) Patent No.: US 8,316,022 B2
(45) Date of Patent: Nov. 20, 2012

(54) INFORMATION PROCESSING APPARATUS AND INFORMATION PROCESSING METHOD

(75) Inventors: Araki Matsuda, Yokohama (JP); Katsutoshi Nagato, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 612 days.

(21) Appl. No.: 12/332,224

(22) Filed: Dec. 10, 2008

(65) Prior Publication Data
US 2009/0164489 A1 Jun. 25, 2009

(30) Foreign Application Priority Data

Dec. 21, 2007 (JP) .................................. 2007-330199
Oct. 27, 2008 (JP) .................................. 2008-276022

(51) Int. Cl.
*G06F 7/00* (2006.01)
*G06F 3/048* (2006.01)
(52) U.S. Cl. ......................... 707/736; 707/748; 715/764
(58) Field of Classification Search .................. 707/736, 707/737, 748; 715/764
See application file for complete search history.

(56) References Cited

U.S. PATENT DOCUMENTS

| 5,847,708 | A | * | 12/1998 | Wolff | 715/764 |
| 2009/0287668 | A1 | * | 11/2009 | Evans et al. | 707/4 |
| 2010/0049708 | A1 | * | 2/2010 | Kawai et al. | 707/5 |

FOREIGN PATENT DOCUMENTS

JP  10-116296 A  5/1998

* cited by examiner

*Primary Examiner* — Vincent Boccio
(74) *Attorney, Agent, or Firm* — Canon USA Inc IP Division

(57) ABSTRACT

Automatic sorting reflecting a user's intention is performed without prompting the user to perform a complicated sorting criterion setting operation. Images are sorted into groups in accordance with user's sorting operations. For each group, statistics of feature values of the sorted images are calculated. On the basis of the result of statistics, a feature value satisfying a predetermined criterion is determined as an automatic sorting criterion. The determined automatic sorting criterion is displayed. Thereafter, a plurality of contents are automatically sorted into the respective groups on the basis of the automatic sorting criterion.

11 Claims, 7 Drawing Sheets

| <<CANDIDATE>> | <<THRESHOLD>> |
|---|---|
| SHOOTING DATE | 0.9 |
| FILE TYPE | 0.9 |
| IMAGE SIZE | 0.9 |
| PERSON | 1.0 |

INFORMATION PROCESSING APPARATUS AND INFORMATION PROCESSING METHOD

BACKGROUND OF THE INVENTION

1. Field of the Invention

The present invention relates to an information processing apparatus suitable for sorting of items, such as icons, and a method for controlling the same.

2. Description of the Related Art

Various methods for sorting a plurality of pieces of electronic information into a plurality of groups are available in the related art.

In a first method, all of sorting criteria available in a computer (sorting system) are presented to a user in advance to allow the user to freely select a sorting criterion and the computer then performs sorting processing on the basis of this sorting criterion.

In a second method, a computer (sorting system) performs sorting processing on the basis of a sorting criterion prepared by the computer itself and then allows a user to modify the result (see, for example, Japanese Patent Laid-Open No. 10-116296). In this manner, automatic sorting based on a similarity measure and modification of the similarity measure are realized.

However, the first method requires a user to set all of the sorting criteria before a start of sorting processing and the operation required for the user to perform is complicated. In addition, in the second method, since sorting processing is performed regardless of whether the employed sorting criterion matches a sorting criterion desired by a user, the user has to examine whether to modify the similarity measure. As described above, the methods available in the related art do not provide a sorting result based on a desired sorting criterion unless the user sets a sorting criterion in detail.

SUMMARY OF THE INVENTION

The present invention provides an information processing apparatus and an information processing method capable of providing a sorting result that reflects a user's intention without prompting the user to perform a complicated sorting criterion setting operation.

According to an aspect of the present invention, an information processing apparatus is provided. The information processing apparatus includes: a specification accepting unit configured to accept, from the outside, specifications of contents and groups into which the contents are to be sorted; a first sorting unit configured to sort the contents into the groups in accordance with the specifications; a statistic calculating unit configured to calculate, for each group, statistics of feature values of the contents sorted by the first sorting unit; a criterion determining unit configured to determine, from the feature values, a feature value satisfying a predetermined criterion as an automatic sorting criterion on the basis of the result of the statistics calculated by the statistic calculating unit; a display controlling configured to control the automatic sorting criterion to be displayed; and a second sorting unit configured to automatically sort a plurality of contents into the groups on the basis of the automatic sorting criterion.

According to another aspect of the present invention an information processing method is provided. The information processing method includes: accepting, from the outside, specifications of contents and groups into which the contents are to be sorted; sorting the contents into the groups in accordance with the specifications; calculating, for each group, statistics of feature values of the sorted contents; determining, from the feature values, a feature value satisfying a predetermined criterion as an automatic sorting criterion on the basis of the result of the calculated statistics; controlling the automatic sorting criterion to be displayed; and automatically sorting a plurality of contents into the groups on the basis of the automatic sorting criterion.

According to still another aspect of the present invention, a computer-readable medium is provided containing computer-executable instructions to be utilized in an information processing apparatus. The medium includes: computer-executable instructions for accepting, from the outside, specifications of contents and groups into which the contents are to be sorted; computer-executable instructions for sorting the contents into the groups in accordance with the specifications; computer-executable instructions for calculating, for each group, statistics of feature values of the sorted contents; computer-executable instructions for determining, from the feature values, a feature value satisfying a predetermined criterion as an automatic sorting criterion on the basis of the result of the calculated statistics; computer-executable instructions for controlling the automatic sorting criterion to be displayed; and computer-executable instructions for automatically sorting a plurality of contents into the groups on the basis of the automatic sorting criterion.

According to an aspect of the present invention, even though a user has not performed a complicated sorting criterion setting operation, sorting processing is automatically performed on the basis of a sorting criterion based on user's specifications if simple sorting processing according to the user's specifications is previously performed. Accordingly, a sorting result that reflects the user's intention is readily obtained.

It is noted that this summary of the invention does not necessarily describe all necessary features of the present invention; rather, the present invention may also be a sub-combination of these described features.

Further features and aspects of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments of the invention and, together with the description, serve to explain the principles of the information.

DESCRIPTION OF THE EMBODIMENTS

Exemplary embodiments of the present invention will be described in detail below with reference to the accompanying drawings.

It is to be noted that the following exemplary embodiments are merely examples for implementing the present invention and can be appropriately modified or changed depending on individual constructions and various conditions of apparatuses to which the present invention is applied. Thus, the present invention is in no way limited to the following exemplary embodiments.

Figure 1:
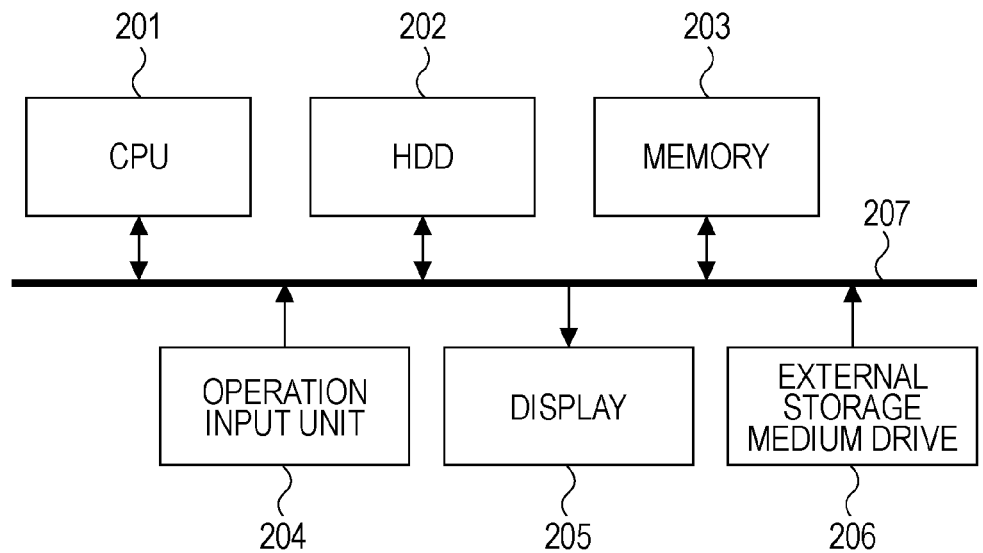
FIG. 1 is a schematic diagram showing a configuration of an information processing apparatus according to a first exemplary embodiment of the present invention.

First, a first exemplary embodiment of the present invention will be described. FIG. 1 is a schematic diagram showing a configuration of an information processing apparatus according to the first exemplary embodiment of the present invention.

This information processing apparatus includes a central processing unit (CPU) 201, a hard disk drive (HDD) 202, a memory 203, an operation input unit 204, a display 205, and an external storage medium drive 206, which are connected to each other through an internal bus 207.

The CPU 201 performs control operations, such as changing of a sorting criterion and starting of automatic sorting processing, on the basis of a sorting processing program recorded on the HDD 202.

Digital data, such as the sorting processing program and coded sorting information, is recorded on the HDD 202 in a computer-readable manner. These pieces of digital data are recorded on the HDD 202 as respective files and managed on the basis of a directory hierarchical structure.

A program code and digital data recorded on the HDD 202 are loaded to the memory 203. The CPU 201 can read the program code and the digital data.

The operation input unit 204 includes a keyboard and a mouse. More specifically, user's operations are input through the operation input unit 204 and detected by the CPU 201.

The display 205 may be a CRT display or a liquid crystal display. Processing procedures are displayed on the display 205 under control of the CPU 201.

The external storage medium drive 206 reads out data from external storage media, such as a CD-ROM and a DVD-ROM, and also writes data in the external storage media.

A description will now be given for an information processing method employed in the information processing apparatus configured in the above-described manner. This method is executed by the CPU 201 on the basis of a sorting processing application (program) recorded on the HDD 202. In addition, information subjected to sorting is, for example, contents, such as image files, recorded on the HDD 202. The CPU 201 activates this application in accordance with a user's activation instruction. At the time of activation of the application, the CPU 201 loads groups of image files subjected to sorting in units of directories in accordance with a user's instruction.

Figure 2:
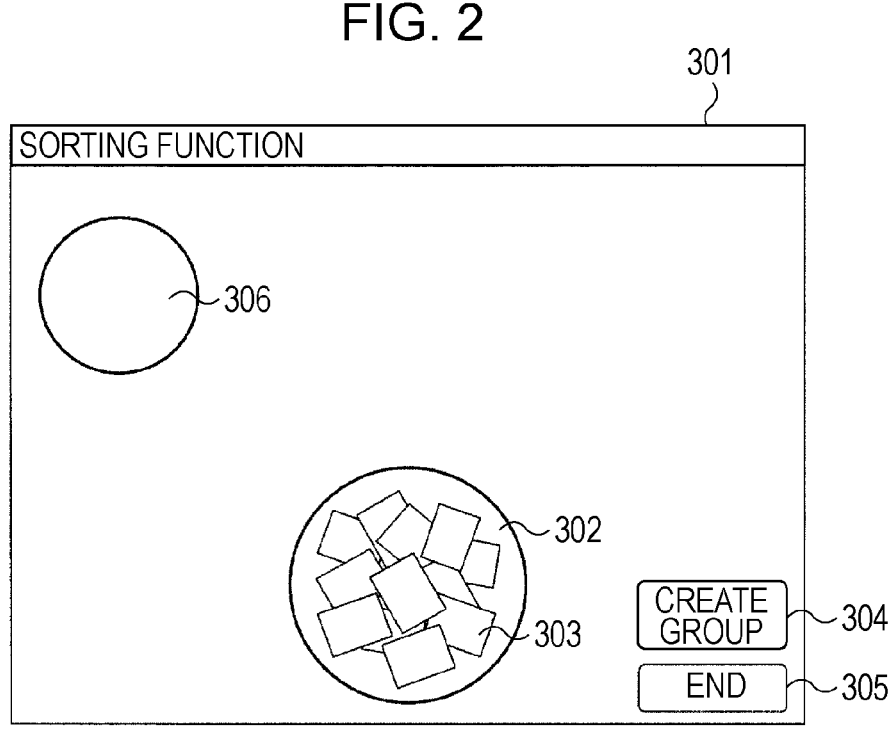
FIG. 2 is a diagram showing an example screen displayed immediately after activation of an application.

FIG. 2 shows an example screen displayed immediately after activation of the application. An application window 301 displays a sorting source group 302, image-file representing icons 303, a sorting destination group 306, a create group button 304, and an end button 305. The icons 303 of unsorted image files are displayed in the sorting source group 302. All of image files included in directories loaded at the time of activation of the application or image files included in a specific directory specified as a sorting target are displayed, as the distinguishable icons 303, in an area of the sorting source group 302.

With this application, an external user can select, from these icons 303, given ones on the basis of an intended sorting criterion and can sort the selected icons into the sorting destination group 306 by performing drag-and-drop operations. In response to performance of such operations, the CPU 201 serving as a specification accepting unit accepts that an image file represented by the dragged icon and a group where the icon is dropped are specified as a sorting target and a sorting destination group, respectively. Under control of the CPU 201, the sorted icon 303 is deleted from the area of the sorting source group 302 and added to an area of the sorting destination group 306. In this manner, the sorting destination group 306 is displayed in a distinguishable manner while sorting by the user is enabled, i.e., while the CPU 201 can accept the sorting instruction.

Figure 3:
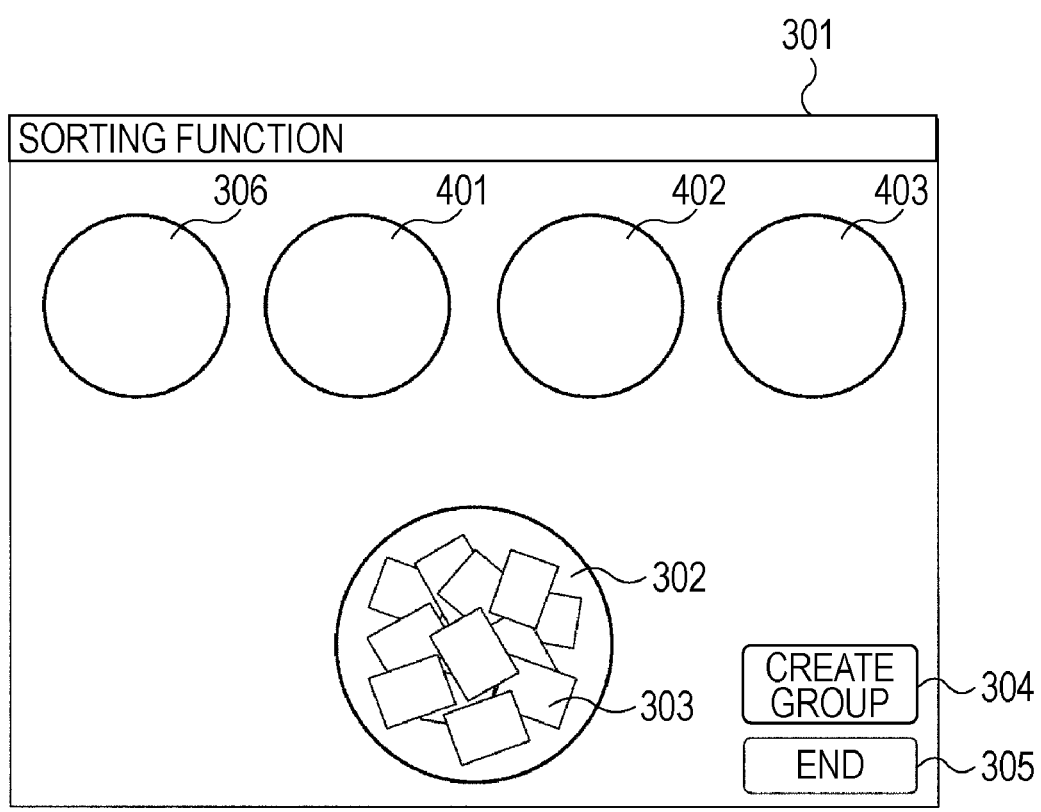
FIG. 3 is a diagram showing an example screen displayed in response to pressing of a create group button 304.

Additionally, in response to pressing of the create group button 304, the CPU 201 adds a new sorting destination group and causes the display 205 to display the new sorting destination group at a blank space of the window 301. For example, when the create group button 304 is pressed three times, the CPU 201 causes the display 205 to additionally display sorting destination groups 401, 402, and 403, as shown in FIG. 3. As a result, a total of four sorting destination groups, including the sorting destination group 306 that exists since activation of the application, are displayed on the display 205. A sufficient space for additionally displaying a new sorting destination group may not exist on the window 301 when the create group button 304 is pressed. In this case, for example, the CPU 201 adds a new sorting destination group after creating a blank space by reducing the size of all of the displayed sorting destination groups already existing in the window 301. In addition, since this application permits the user to operate the create group button 304 even after the start of the sorting processing, the user can add new sorting destination groups at any time the user desires. In this manner, the user can create a desired number of sorting destination groups by repeatedly pressing the create group button 304.

In response to pressing of the end button 305, the CPU 201 creates a storage destination directory for each sorting destination group and stores image files that have been sorted at that time in the respective storage destination directory. At this time, these image files are deleted from a sorting source directory. In addition, image files that have not been sorted at the time of pressing of the end button 305 are continuously stored in the sorting source directory. In this manner, with this application, the user can terminate the application after storing the sorting result by pressing the end button 305.

Figure 4:
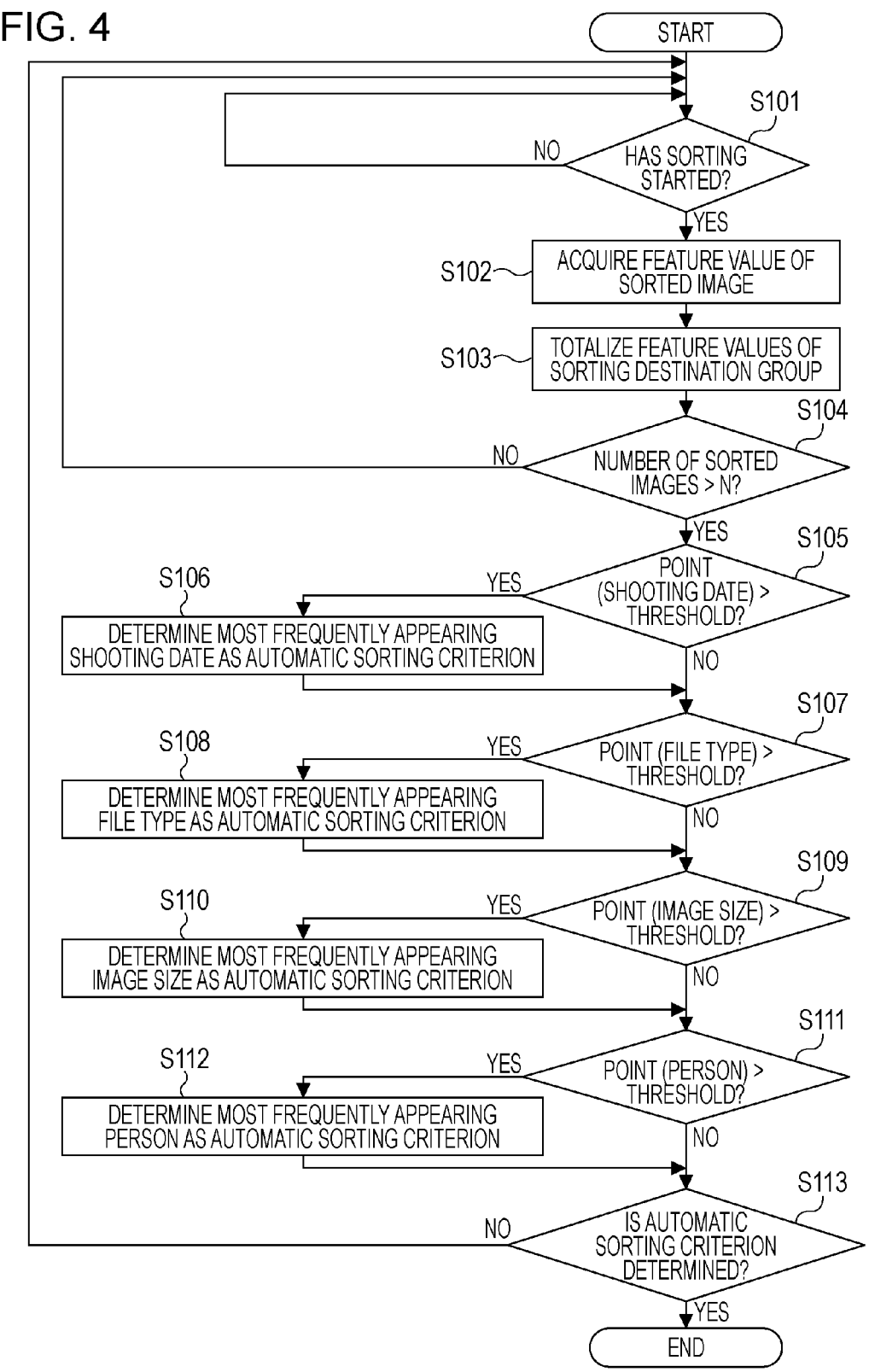
FIG. 4 is a flowchart showing an information processing method according to a first exemplary embodiment of the present invention.

Processing executed after the user has started a sorting operation will now be described. FIG. 4 is a flowchart showing an information processing method according to the first exemplary embodiment of the present invention.

First, at STEP S101, the CPU 201 determines whether an image file is sorted through a user's drag-and-drop operation. If the sorting operation is not performed, the process returns to STEP S101, whereas, if the sorting operation is performed, the process proceeds to STEP S102.

At STEP S102, the CPU 201 acquires feature values of the sorted image file. As the feature values of the image file, four kinds of items, namely, a shooting date, a file type, an image size, and a person captured as a subject (hereinafter, referred to as a subject person), are employable.

These feature values will now be described.

The shooting date is information attached in accordance with the exchangeable image file format (Exif) standard and is attached to files of images captured with digital cameras. In addition, information on the file type and the image size are also contained in image files if the image files are compliant with the Exif standard. Bitmap files, among those not compliant with the Exif standard, also contain these pieces of information in a file header thereof. In this exemplary embodiment, for example, images in these formats are treated as sorting targets.

Regarding the subject person, a person is identified using face verification processing. The face retrieval and verification processing employed in this exemplary embodiment is based on, for example, a method proposed by Laurenz Wiskott, et al (see Laurenz Wiskott, Jean-Marc Fellous, Norbert Kruger, and Christoph von der Malsburg, "Face Recognition by Elastic Bunch Graph Matching" IEEE Trans. on Pattern Analysis and Machine Intelligence, vol. 19, no. 7, pp. 775-779, 1997).

In this method, processing is performed in the following order:

(1) Human faces are retrieved from retrieval target images.
(1-1) The contour of a face image is roughly detected from a retrieval target image using a wavelet transform method. More specifically, a face graph including a small number of nodes is applied to the image to detect a face area from the target image.
(1-2) On the basis of the position of the roughly detected face, the angle and size of the face are then corrected. Thereafter, a face graph composed of many nodes including a position of each face part is created using the wavelet transform again. The face graph created here is face data that characterizes the original face image.
(1-3) The above-described operation is repeatedly performed on the plurality of retrieval target images and images determined to include faces are set as person containing images.
(2) Resembling faces are retrieved from the retrieval target images.
(2-1) As in the case of (1), the contour of a face image is roughly detected from a retrieval target image using the wavelet transform method.
(2-2) On the basis of the position of the roughly detected face, the angle and size of the face are then corrected. Thereafter, a face graph composed of many nodes including a position of each face part is created using the wavelet transform again. The face graph created here is face data that characterizes the face included in the retrieval target image.
(2-3) A feature value of the face graph created above is compared with that of a face graph of a face specified by a retrieval condition. If the difference therebetween is equal to or smaller than a threshold, the face is determined to resemble.
(2-4) The above-described operation is repeatedly performed on the plurality of retrieval target images.

By performing this processing, the subject person can be extracted from images.

After STEP S102, the CPU 201 totalizes the feature value acquired at STEP S102 as a feature value of the sorting destination group to calculate statistics at STEP S103, whereby the CPU 201 serving as a statistic calculating unit creates a sorting criterion.

Figures 5, 6:
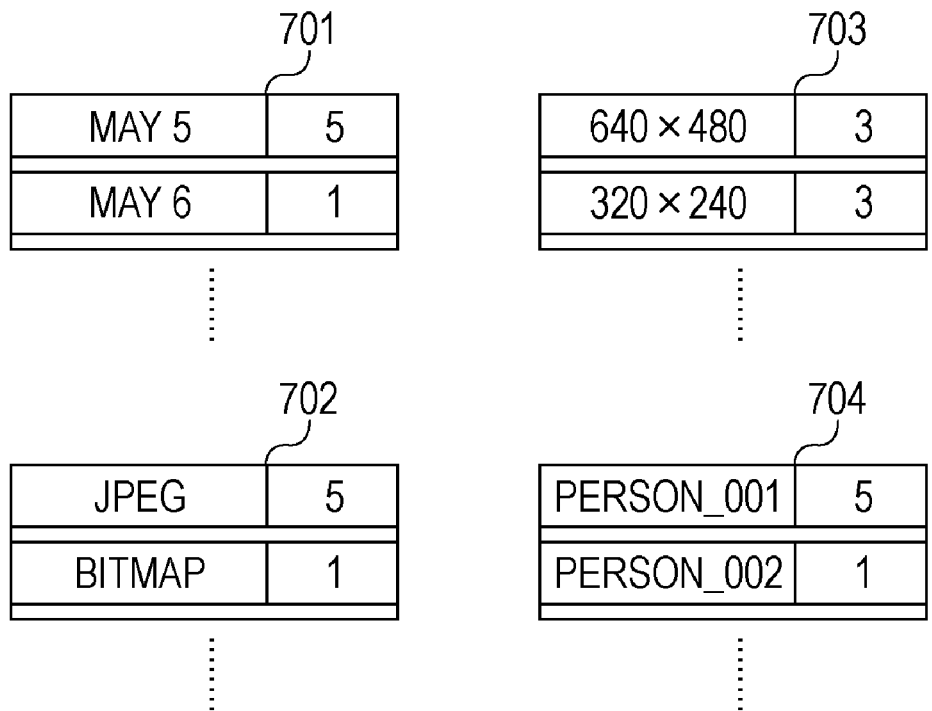
FIG. 5 is a schematic diagram showing data structures.
FIG. 6 is a diagram showing examples of thresholds.

A detail of totalization of the feature values will now be described. To do this totalization, the CPU 201 employs a predetermined data structure set for each sorting destination group. FIG. 5 is a schematic diagram showing data structures. The data structures include data 701, which is a combination of shooting dates acquired from all image files sorted into one storing destination group and appearance frequencies thereof. More specifically, if the shooting dates of the image files sorted into one sorting destination group vary, data of each shooting date and the appearance frequency thereof is created in a list structure. The data structures also include data 702, which is a combination of file types acquired from all image files sorted into one sorting destination group and the appearance frequencies thereof. Furthermore, the data structures include data 703, which is a combination of image sizes acquired from all image files sorted into one sorting destination group and the appearance frequencies thereof. Furthermore, the data structures also include data 704, which is a combination of subject persons acquired from all image files sorted into one sorting destination group and the appearance frequencies thereof. That is, combinations of the file types, the image sizes, and the subject persons and the appearance frequencies thereof are constructed in a list structure, respectively. Meanwhile, regarding the subject person, for example, an ID for identifying each person is appropriately determined and stored.

After STEP S103, the CPU 201 determines whether the number of image files having been sorted into the sorting destination group exceeds a predetermined value N at STEP S104. If the number of image files does not exceed N, the process returns to STEP S101. If the number of image files exceeds N, the process proceeds to STEP S105.

At STEP S105, the CPU 201 detects the most frequently appearing shooting date with reference to the data 701 (FIG. 5) and determines whether a result obtained by dividing this detected shooting date appearance frequency by the number of image files sorted into the sorting destination group exceeds a predetermined threshold. As shown in FIG. 6, this threshold is set for each of the four feature values. For example, the values are set by the user in advance. Through this determination, the information processing apparatus can estimate whether a user performs a sorting operation on the basis of the shooting date. More specifically, when a ratio of the image files having the most frequently appearing shooting date is particularly high and concentrates, it can be estimated that the sorting operation is performed on the basis of the shooting date. If the division result exceeds the threshold, the processing proceeds to STEP S106. Otherwise, the processing proceeds to STEP S107.

At STEP S106, the CPU 201 determines, regarding the item of the shooting date, the most frequently appearing shooting date as an automatic sorting criterion employed in sorting processing to be executed later. More specifically, the CPU 201 serving as a criterion determining unit determines a shooting date that satisfies a predetermined criterion regarding the shooting date as the automatic sorting criterion. The process then proceeds to STEP S107.

At STEP S107, the CPU 201 detects the most frequently appearing file type with reference to the data 702 (FIG. 5). The CPU 201 then determines whether a result obtained by dividing the detected file type appearance frequency by the number of image files sorted into the sorting destination group exceeds a predetermined threshold (FIG. 6). Through this determination, the information processing apparatus can estimate whether a user performs a sorting operation on the basis of the file type. More specifically, a ratio of image files of the most frequently appearing file type is particularly high and concentrates, it can be estimated that the sorting operation is performed on the basis of the file type. If the division result exceeds the threshold, the process proceeds to STEP S108. Otherwise, the process proceeds to STEP S109.

At STEP S108, the CPU 201 determines, regarding the item of the file type, the most frequently appearing file type as the automatic sorting criterion employed in sorting processing to be executed later. More specifically, the CPU 201 serving as the criterion determining unit determines a file type that satisfies a predetermined criterion regarding the file type as the automatic sorting criterion. The process then proceeds to STEP S109.

At STEP S109, the CPU 201 detects the most frequently appearing image size with reference to the data 703 (FIG. 5). The CPU 201 then determines whether a result obtained by dividing the detected appearing frequency of the image size by the number of image files sorted into the sorting destination group exceeds a predetermined threshold (FIG. 6). Through this determination, the information processing apparatus can estimate whether a user performs a sorting operation on the basis of the image size. More specifically, a ratio of image files having the most frequently appearing image size is particularly high and concentrates, it can estimated that the sorting operation is performed on the basis of the image size. If the division result exceeds the threshold, the process proceeds to STEP S110. Otherwise, the process proceeds to STEP S111.

At STEP S110, the CPU 201 determines, regarding the item of the image size, the most frequently appearing image size as the automatic sorting criterion employed in sorting processing to be executed later. More specifically, the CPU 201 serving as the criterion determining unit determines an image size that satisfies a predetermined criterion regarding the image size as the automatic sorting criterion. The process then proceeds to STEP S111.

At STEP S111, the CPU 201 detects the most frequently appearing subject person with reference to the data 704 (FIG. 5). The CPU 201 then determines whether a result obtained by dividing this detected appearing frequency of the subject person by the number of image files sorted into the sorting destination group exceeds a predetermined threshold (FIG. 6). Through this determination, the information processing apparatus can estimate whether a user performs a sorting operation on the basis of the subject person. More specifically, when a ratio of image files including the most frequently appearing subject person is particularly high and concentrates, it can be estimated that the sorting operation is performed on the basis of the subject person. If the division result exceeds the threshold, the process proceeds to STEP S112. Otherwise, the process proceeds to STEP S113.

At STEP S112, the CPU 201 determines, regarding the item of the subject person, the most frequently appearing subject person as the automatic sorting criterion employed in sorting processing to be executed later. More specifically, the CPU 201 serving as the criterion determining unit determines a subject person that satisfies a predetermined criterion regarding the subject person as the automatic sorting criterion. The process then proceeds to STEP S113.

At STEP S113, the CPU 201 confirms whether at least one of the shooting date, the file type, the image size, and the subject person is determined as the automatic sorting criterion. If the automatic sorting criterion is not determined, the process returns to STEP S101. Otherwise, the process terminates.

According to such a method, the automatic sorting criterion for a given sorting destination group is determined after a predetermined number of image files are sorted into the sorting destination group in response to user's sorting operations. Once the automatic sorting criterion is determined, the CPU 201 can automatically perform sorting processing to the sorting destination group on the basis of the application thereafter.

Figure 7:
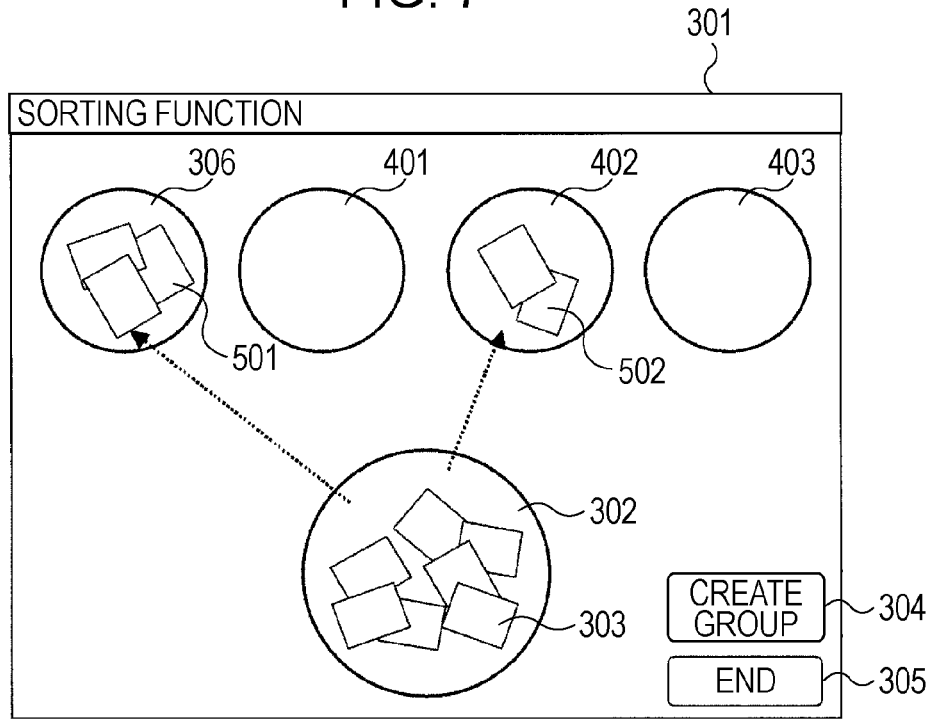
FIG. 7 is a diagram showing an example screen displayed at an early stage of sorting processing according to a first exemplary embodiment of the present invention.

For example, at a stage before determination of the automatic sorting criterion, i.e., at an early stage of sorting processing, user's drag-and-drop operations have to be performed as shown in FIG. 7. More specifically, for example, some of the icons 303 are moved to a sorting destination group 306 as icons 501 with the drag-and-drop operations, whereas some of the icons 303 are moved to a sorting destination group 402 as icons 502 with the drag-and-drop operations. That is, the icons 501 and 502 are added to areas of the sorting destination groups 306 and 402, respectively, the icons 303 corresponding to these icons 501 and 502 are deleted from the sorting source group 302.

Figure 8:
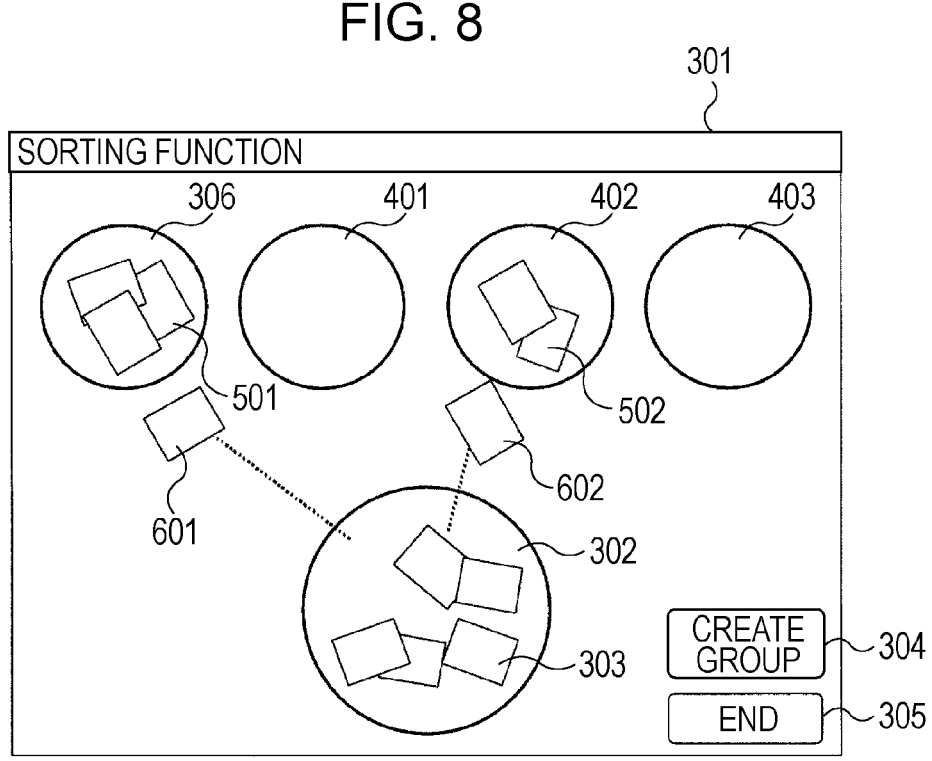
FIG. 8 is a diagram showing sorting processing performed by a CPU 201.

If the number of icons moved to a given sorting destination group reaches a predetermined value after repetition of such processing, an automatic sorting criterion is determined regarding the sorting destination group. Thus, as shown in FIG. 8, the CPU 201 executes automatic sorting processing to the sorting destination group. More specifically, some of the icons 303 included in the area of the sorting source group 302 that satisfy the automatic sorting criterion are sequentially moved in the processing performed by the CPU 201. For example, the icons 303 satisfying the automatic sorting criterion set for the sorting destination group 306 are moved to the sorting destination group 306 as icons 601. Additionally, the icons 303 satisfying the automatic sorting criterion set for the sorting destination group 402 are moved to the sorting destination group 306 as icons 602. According to this application, the CPU 201 continuously performs the sorting processing until the icons 303 satisfying the automatic sorting criterion no longer exist in the sorting source group 302 and terminates the sorting processing if the sortable icons no longer exist. Accordingly, the icons 303 of image files not satisfying the automatic sorting criterion remain in the area of the sorting source group 302. In addition, the CPU 201 does not sort but leaves icons of image files satisfying automatic sorting criteria for a plurality of sorting destination groups.

Additionally, this application allows the user to sort images included in the sorting source group 302 by freely selecting corresponding icons and performing drag-and-drop operations even after the CPU 201 has started the automatic sorting processing. Furthermore, the application also allows the user to perform the sorting operation even after termination of the sorting processing of the CPU 201 until the end button 305 is pressed.

Preferably, an icon moving speed at the time of sorting processing performed by the CPU 201 may be set at a speed visually recognizable by the user in order to allow the user to sort the icon into another sorting destination group different from the one selected by the CPU 201 with a drag-and-drop operation. More specifically, the icon moving speed is set to allow the user to immediately modify the sorting result when the automatic sorting criterion determined by the CPU 201 differs from the one intended by the user.

Figure 9:
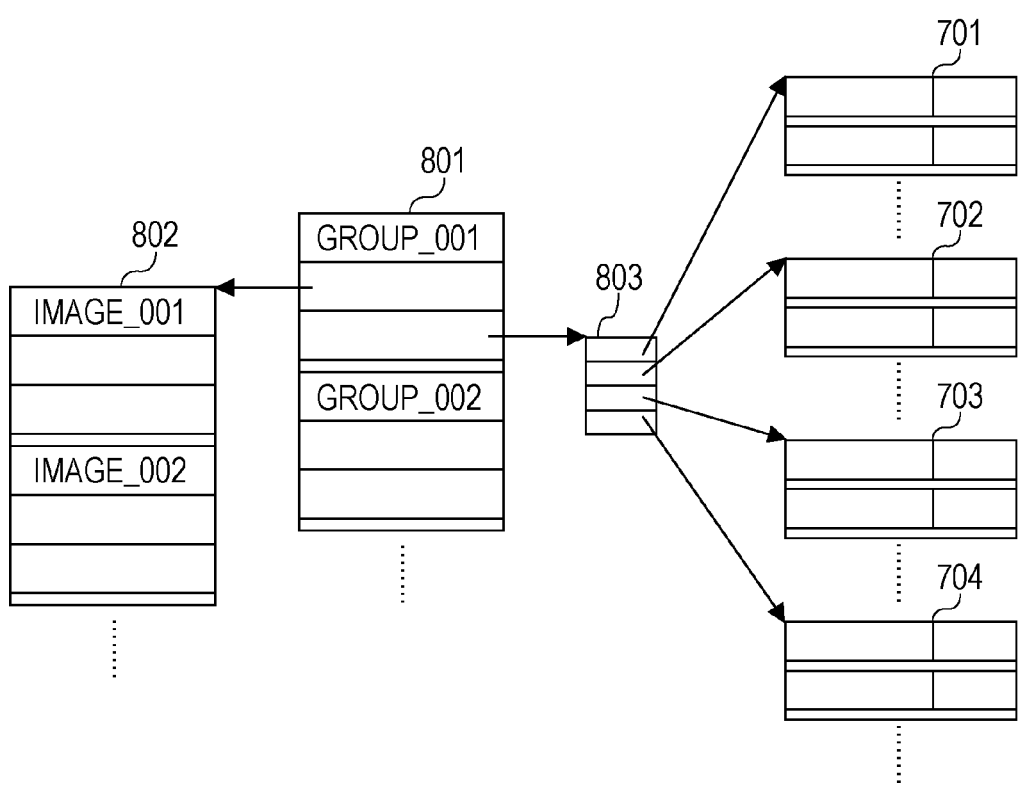
FIG. 9 is a schematic diagram showing a data structure of a group information management list.

After sorting of the images, sorted image files are no longer associated with a group information list for managing the sorting source group with respect to data management of the application. Instead, the sorted image files are associated with a group information management list for a sorting destination group that the image files are sorted into. FIG. 9 is a schematic diagram showing a data structure of a group information management list.

As shown in FIG. 9, a group information management list 801 manages information regarding a plurality of sorting destination groups in a list structure. Information on each sorting destination group includes a unique ID indicating the group, information indicating a reference destination of an image information management list 802 including image files belonging to the group, and information indicating a reference destination of feature value management information 803. The image information management list 802 includes a unique ID indicating an image file, a character string representing a location of the image file in a file system, thumbnail data to be displayed in each icon to allow visual identification of the image. In addition, the feature value management information 803 manages information indicating reference destinations of the data 701-704 that manages the four kinds of feature values shown in FIG. 5. In this application, for example, the data structure shown in FIG. 9 is employed to manage data related to sorting destination groups. Every time the user's sorting operation or the CPU 201's automatic sorting processing is performed, a sorting destination group to which an image file belongs is changed. In response to this change, each piece of information is updated and the feature values represented by the data 701-704 are also updated. Suppose that an image file is newly sorted with the user's sorting operation or the CPU 201's automatic sorting processing, for example. Then, information referring to information of the newly added image file included in the image information management list 802 is added to information on a sorting destination group into which the image file is newly sorted in the group information management list 801.

According to such a first exemplary embodiment, a user can obtain a sorting result based on an intended sorting criterion by performing a relatively small number of simple operations instead of performing a complicated sorting criterion setting operation. More specifically, according to the first exemplary embodiment, since the CPU 201 learns a sorting criterion on the basis of user's sorting operations and automatically performs sorting processing on the basis of an automatic sorting criterion, which is determined on the basis of this sorting criterion, an operation required for the user to perform is simplified.

Meanwhile, information subjected to sorting is not limited to image files and other kinds of contents from which a feature value can be extracted in the similar manner can also be subjected to the sorting. For example, kinds of the information subjected to the sorting include music files, document files, and a plurality of contents included in an identical file. In addition, the feature value extraction targets are not limited to the four kinds, namely, the shooting date, the file type (content type), the image size, and the subject person, and other kinds of information associated with the information subjected to the sorting may be set as the feature value extraction target.

Furthermore, a trigger of a start of sorting processing of the CPU 201 is not limited to the number of image files sorted in user's sorting operations. In addition, whether to execute automatic sorting processing by the CPU 201 may be determined after determination of the automatic sorting criterion. For example, STEP S104 shown in FIG. 4 may be omitted and a difference between the automatic sorting criterion and the data 701-704 may be calculated after it is determined that the automatic sorting criterion is determined at the STEP S113. The start of the CPU 201's sorting processing may be triggered if the calculated difference is equal to or smaller than a threshold.

Such processing is effective when the number of types of feature values is not sufficient. For example, in this exemplary embodiment, feature values of the shooting date, the file type, the image size, and the subject are set as the automatic sorting criteria. However, a user may perform a sorting operation on the basis of a criterion different from these automatic sorting criteria. In such a case, a difference between the sorting criterion intended by the user and the automatic sorting criterion may be caused. In addition, regarding the subject, a difference may be caused when the user considers a subject different from that identifiable by the information processing apparatus as a sorting criterion. Furthermore, when the user fails to perform the sorting operation and part of information is mistakenly sorted into a group different from a correct sorting destination, the difference may also be caused. In these cases, as described above, it is effective to calculate a difference between the automatic sorting criterion and the data 701-704 and trigger the start of the CPU 201's sorting processing if the calculated difference is equal to or smaller than a threshold.

A second exemplary embodiment of the present invention will be described. As described above, in the application according to the first exemplary embodiment, the CPU 201 performs automatic sorting processing into a sorting destination group when a predetermined number of files have been sorted with user's sorting operations. In contrast, in an application according to the second exemplary embodiment, the CPU 201 performs sorting processing in response to an automatic sorting start instruction entered by a user. However, when the user's sorting operation is performed only several times, reliability of a sorting criterion is low and it is difficult to obtain a desired sorting result. Accordingly, in this exemplary embodiment, likelihood corresponding to the reliability of the sorting criterion is also displayed. Sorting processing according to the second exemplary embodiment will be described in detail below while focusing on a difference between the sorting processing according to this exemplary embodiment and that according to the first exemplary embodiment.

Figure 10:
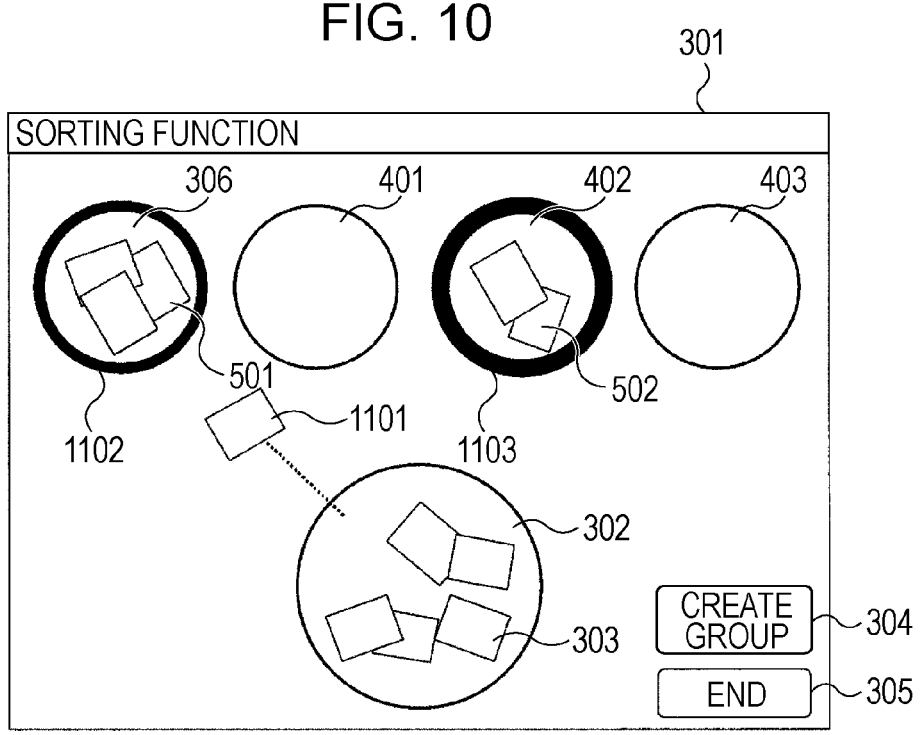
FIG. 10 is a diagram showing an example screen displayed at an early stage of sorting processing according to a second exemplary embodiment of the present invention.

As in the case of the first exemplary embodiment, in the second exemplary embodiment, user's drag-and-drop operations are needed at an early stage of sorting processing as shown in FIG. 10. More specifically, for example, some of icons 303 are moved to a sorting destination group 306 as icons 501 with drag-and-drop operations, whereas some of the icons 303 are moved to a sorting destination group 402 as icons 502 with drag-and-drop operations. That is, the icons 501 and 502 are added to areas of the sorting destination groups 306 and 402, respectively, and the icons 303 corresponding to these icons 501 and 502 are deleted from a sorting source group 302.

Each time an icon 1101 is moved to a given sorting destination group in response to such an operation, the CPU 201 updates data 701-704 (FIG. 5) of the sorting destination group. In addition, if a score of a sorting criterion based on the respective data 701-704 reaches, for example, ⅓ of a predetermined threshold (FIG. 6), a slightly thicker outer frame 1102 is attached to the sorting destination group. Furthermore, if the score of the sorting criterion reaches ½ of the predetermined threshold, a much thicker outer frame 1103 is attached to the sorting destination group. In an example shown in FIG. 10, regarding the sorting destination group 306, a result obtained by dividing an appearing frequency of a feature value of at least one of the data 701-704 having the highest appearing frequency by a number of image files sorted into the sorting destination group exceeds ⅓ of the predetermined threshold. In addition, regarding the sorting destination group 402, a result obtained by dividing an appearing frequency of a feature value of at least one of the data 701-704 having the highest appearing frequency by the number of image files stored into the sorting destination group exceeds ½ of the predetermined threshold. Accordingly, in this exemplary embodiment, thickness of the outer frame incrementally represents likelihood of the sorting criterion obtained at that time.

Figure 11:
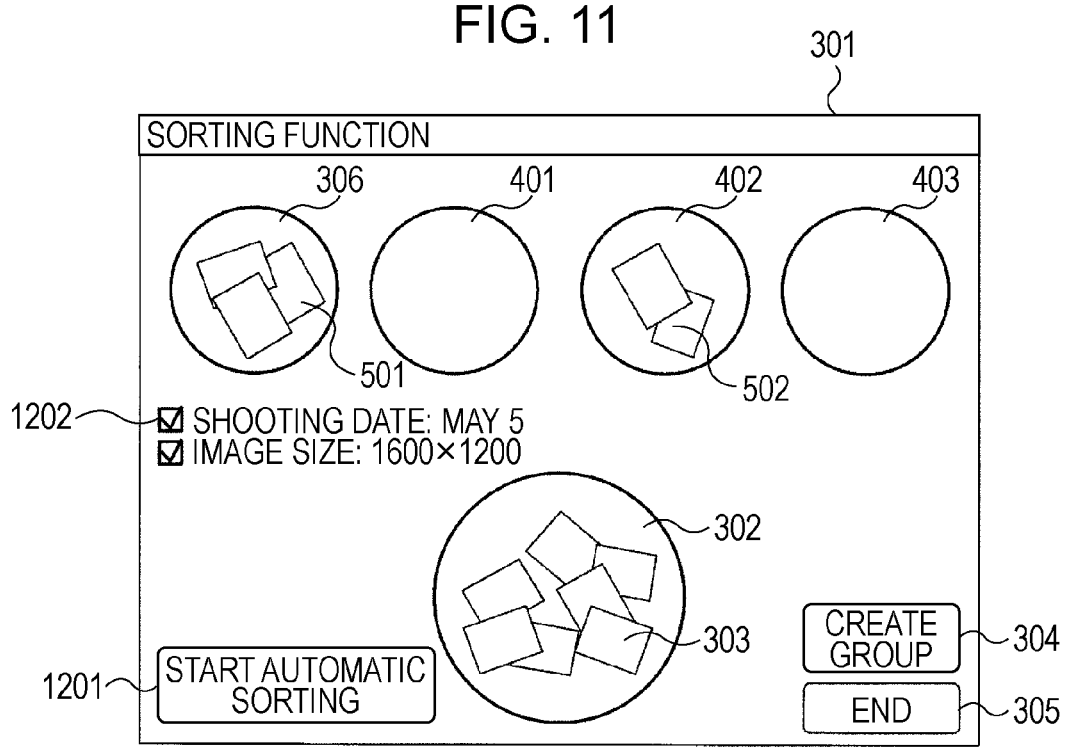
FIG. 11 is a diagram showing an example screen displayed after determination of automatic sorting criteria according to a second exemplary embodiment of the present invention.

After repetition of such processing, the result obtained by dividing the appearing frequency of the feature value of at least one of the data 701-704 having the highest appearing frequency by the number of image files sorted into the sorting destination group reaches the predetermined threshold in a given sorting destination group. In such a state, the CPU 201 determines an automatic sorting criterion for the sorting destination group. The CPU 201 then causes a display 205 to display, as shown in FIG. 11, the automatic sorting criterion at the sorting destination group, regarding which the automatic sorting criterion has determined, as an established sorting criterion 1202 and to display a start automatic sorting button 1201. The established sorting criterion is attached with a checkbox. More specifically, the established sorting criterion 1202 and the checkbox are output as an image.

More specifically, the CPU 201 displays, separately for each sorting destination group, only determined criteria employable in automatic sorting as the established sorting criteria 1202. In addition, the CPU 201 serving as an employed criterion accepting unit accepts, from an external user, an instruction for switching validity/invalidity of the automatic sorting criterion, i.e., an instruction for switching employment/unemployment of the established sorting criterion 1202 through the checkbox. When the user invalidates the automatic sorting criterion, the criterion is not reflected in the automatic sorting processing. The CPU 201 also accepts an instruction for starting the automatic sorting processing through the start automatic sorting button 1201. More specifically, in response to user's pressing of the start automatic sorting button 1201, the CPU 201 detects the pressing of the start automatic sorting button 1201 as a start instruction and starts the automatic sorting processing. The user can continue an intended sorting operation without pressing the start automatic sorting button 1201. In addition, the user also can sort unsorted images in parallel to the automatic sorting processing even after pressing of the button 1201. In this manner, in this exemplary embodiment, the CPU 201 starts the sorting processing on the basis of existence/absence of pressing of the start automatic sorting button 1201. Meanwhile, as in the case of the first exemplary embodiment, the CPU 201 may start the automatic sorting processing on condition that the user has sorted a predetermined number of image files into a given sorting destination group. In addition, display of the established sorting criterion 1202, the checkbox, and the start automatic sorting button 1201, and acceptance of the instruction for switching validity/invalidity of the automatic sorting criterion (the instruction for switching employment/unemployment of the established sorting criterion 1202) through the checkbox may be performed in the first exemplary embodiment. More specifically, upon determining that the number of image files sorted by the user exceeds the predetermined value N at STEP S104 shown in FIG. 4, the CPU 201 determines a feature value satisfying a predetermined criterion as an automatic sorting criterion at respective STEP S106, S108, S110, or S112. If YES is selected at STEP S113, the CPU 201 displays the determined automatic sorting criteria as the established sorting criteria 1202 along with checkboxes and also displays the start automatic sorting button 1201. The user then operates ON/OFF of the checkboxes to enable only desired automatic sorting criteria. After finishing the operation on the checkboxes, the user presses the start automatic sorting button 1201. In response to pressing of the start automatic sorting button 1201, the CPU 201 sorts image files into a sorting destination group in accordance with the established sorting criteria whose checkbox is ON (checked).

According to such a second exemplary embodiment, a user can obtain a sorting result based on an intended sorting criterion by performing simple operations instead of performing a complicated sorting criterion setting operation. More specifically, according to the second exemplary embodiment, since the CPU 201 learns a sorting criterion on the basis of user's sorting operations and automatically performs sorting processing on the basis of an automatic sorting criterion, which is determined on the basis of this sorting criterion, an operation required for the user to perform is simplified.

When the user attempts to manually perform a sorting operation after determination of the automatic sorting criterion, it is preferable for the CPU 201 to highlight an automatic sorting criterion if the automatic sorting criterion that an icon to be sorted by the user is compliant with exists.

In addition, preferably, icons sorted by the user and icons automatically sorted by the CPU 201 are displayed in a distinguishable manner.

Furthermore, if an icon sorted into a given sorting destination group by the user that does not satisfy an automatic sorting creation determined regarding the sorting destination group is present, it is preferable to display the icon in a distinguishable manner. Additionally, regarding the icon not satisfying the automatic sorting criterion determined for the sorting destination group, the icon and a corresponding image file may be returned to a sorting source group or may be re-sorted into another sorting destination group in according with the automatic sorting criterion.

These exemplary embodiments are only an example realizing the present invention and can be appropriately modified or altered depending on constructions and various conditions of apparatuses to which the present invention is applied.

Additionally, the exemplary embodiments of the present invention can be realized by, for example, a computer executing a program. In addition, means for providing the program to the computer, e.g., a computer-readable recording medium, such as a CD-ROM, that stores such a program or a transmission medium, such as the Internet, that transmits such a program can be employed as an exemplary embodiment of the present invention. In addition, a program for the above-described sorting processing can also be employed as an exemplary embodiment of the present invention. The program, the recording medium, the transmission medium, and the program product are also included in the scope of the present invention.

Although, for example, an execution program and digital data recorded on the HDD 202 are used in the above-described exemplary embodiments, the execution program and the digital data may be recorded on an external storage medium. In this case, processing is performed through the external storage medium drive 206. In addition, the CPU 201 may load the execution program or the digital data via a network.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-330199 filed Dec. 21, 2007, and Japanese Patent Application No. 2008-276022 filed Oct. 27, 2008, which are hereby incorporated by reference in their entirety.

What is claimed is:

1. An information processing apparatus, comprising:
a processor and memory;
a display control unit configured to perform control so that a first display object representing a content item and an area that contains the first display object are displayed on a display unit;
an instruction receiving unit configured to receive a drag operation for moving the first display object to the area;
a first sorting unit configured to sort the content represented by the first display object moved to the area in accordance with the drag operation received by the instruction receiving unit into a group corresponding to the area;
a statistic calculating unit configured to calculate, for the group, statistics of feature values of the contents sorted by the first sorting unit;
a criterion determining unit configured to determine, from the feature values, a feature value satisfying a predetermined criterion as an automatic sorting criterion on the basis of the result of the statistics calculated by the statistic calculating unit;
a displaying unit configured to display the automatic sorting criterion determined by the criterion determining unit;
an employed criterion accepting unit configured to accept an instruction for switching employment/unemployment of the displayed automatic sorting criterion;
a starting instruction accepting unit configured to accept a starting instruction of automatic sorting; and
a second sorting unit configured to, in a case where the starting instruction accepting unit accepts the starting instruction of automatic sorting, automatically sort a plurality of contents into the group in accordance with an automatic sorting criterion obtained by applying the instruction accepted by the employed criterion accepting unit to the automatic sorting criterion determined by the criterion determining unit.

2. The apparatus according to claim 1, wherein the criterion determining unit determines the automatic sorting criterion on condition that a predetermined number of contents have been sorted by the first sorting unit.

3. The apparatus according to claim 1, wherein contents sorted by the first sorting unit and contents sorted by the second sorting unit are displayed in a distinguishable manner.

4. The apparatus according to claim 1, wherein likelihood of the feature value being the automatic sorting criterion is displayed in an incrementally distinguishable manner on the basis of the statistics calculated by the statistic calculating unit.

5. The apparatus according to claim 1, wherein contents that have been sorted by the first sorting unit but do not match the automatic sorting criterion are displayed in a distinguishable manner.

6. The apparatus according to claim 1,
wherein the displaying unit displays the automatic sorting criterion and one or more display items for accepting the starting instruction of automatic sorting, and
wherein the starting instruction accepting unit accepts the starting instruction of automatic sorting via the one or more display items.

7. The apparatus according to claim 1, wherein when a user tries to manually sort the contents after the automatic sorting criterion is determined by the criterion determining unit, and in a case where there is an automatic sorting criterion which matches the contents that the user is trying to sort, the displaying unit displays the automatic sorting criterion in a distinguishable manner.

8. The apparatus according to claim 1, wherein the instruction receiving unit receives the drag operation after the second sorting unit starts the automatic sorting.

9. The apparatus according to claim 1, wherein the group is displayed in a distinguishable manner while the instruction receiving unit can receive the drag operation.

10. An information processing method performed in an information processing apparatus which includes a processor and memory, the method comprising:
performing control, via a display control unit, to display a first display object representing a content item and an area that contains the first display object on a display unit;
receiving, via an instruction receiving unit, a drag operation for moving the first display object to the area;
sorting, via a first sorting unit, the content represented by the first display object moved to the area in accordance with the drag operation received by the instruction receiving unit into a group corresponding to the area;
calculating, via a calculating unit, for the group, statistics of feature values of the sorted contents;
determining, via a criterion determining unit, from the feature values, a feature value satisfying a predetermined criterion as an automatic sorting criterion on the basis of the result of the calculated statistics;
displaying, via a displaying unit, the automatic sorting criterion determined by the criterion determining unit;
accepting, via an employed criterion accepting unit, an instruction for switching employment/unemployment of the displayed automatic sorting criterion;
accepting, via a starting instruction accepting unit, a starting instruction of automatic sorting; and
automatically sorting, via a second sorting unit, in a case wherein the starting instruction accepting unit accepts the starting instruction of automatic sorting, a plurality of contents into the group in accordance with an automatic sorting criterion obtained by applying the instruction accepted by the employed criterion accepting unit to the automatic sorting criterion determined by the criterion determining unit.

11. A non-transitory computer-readable medium containing computer-executable instructions to be utilized in an information processing apparatus which includes a processor and memory, the medium comprising:
computer-executable instructions for performing control so that a first display object representing a content item and an area that contains the first display object are displayed;
computer-executable instructions for receiving a drag operation for moving the first display object to the area;
computer-executable instructions for sorting the content represented by the first display object moved to the area in accordance with the received drag operation into a group corresponding to the area;
computer-executable instructions for calculating, for the group, statistics of feature values of the sorted contents;
computer-executable instructions for determining, from the feature values, a feature value satisfying a predetermined criterion as an automatic sorting criterion on the basis of the result of the calculated statistics;
computer-executable instructions for displaying the determined automatic sorting criterion;

computer-executable instructions for accepting an instruction for switching employment/unemployment of the displayed automatic sorting criterion;
computer-executable instructions for accepting a starting instruction of automatic sorting; and
computer-executable instructions for, in a case where the starting instruction of automatic sorting is accepted, automatically sorting a plurality of contents into the group in accordance with an automatic sorting criterion obtained by applying the accepted starting instruction to the determined automatic sorting criterion.

* * * * *